Dec. 29, 1959 K. D. BROADBENT 2,919,432

MAGNETIC DEVICE

Filed Feb. 28, 1957 2 Sheets-Sheet 1

Kent D. Broadbent,
INVENTOR.
BY. [signature]
AGENT.

Dec. 29, 1959 K. D. BROADBENT 2,919,432

MAGNETIC DEVICE

Filed Feb. 28, 1957 2 Sheets-Sheet 2

| Time Interval | Q $F_{30}$ | Q $F_{32}$ |
|---|---|---|
| $T_1$ | 1 | 0 |
| $T_2$ | 0 | 1 |
| $T_3$ | 1 | 1 |
| $T_4$ | 0 | 0 |

Kent D. Broadbent,
INVENTOR.

BY [signature]

AGENT.

United States Patent Office 2,919,432

Patented Dec. 29, 1959

2,919,432

MAGNETIC DEVICE

Kent D. Broadbent, San Pedro, Calif., assignor to Hughes Aircraft Company, Culver City, Calif., a corporation of Delaware Application February 28, 1957, Serial No. 643,107

16 Claims. (Cl. 340—174)

This invention relates to magnetic devices and, more particularly, to a method and apparatus for storing and propagating information in a magnetic material.

Magnetic devices have had extensive use in digital computers for applications such as delay lines, shift registers and the like. When a magnetic device is employed as a shift register, for example, the electrical information to be processed has been generally represented in terms of a binary code. Accordingly, bistable storage elements have been extensively used for processing this binary information. Magnetic core devices exhibiting the desired bistable characteristics have been arranged for delaying and shifting information and have found extensive use due to their inherent simplicity. When a plurality of these magnetic core devices are arranged as a shift register to shift binary coded information directly through the register in a given direction, unilateral impedance devices such as diodes for preventing the backflow of information are necessary. The unilateral impedance devices that are arranged in the transfer circuit between the individual magnetic core elements along with other circuit components are an important factor leading to the large power requirements necessary for shifting information through the magnetic core devices.

A magnetic shift register that eliminates the need for a transfer circuit and the associated unilateral impedance devices and components, yet maintaining the required unilateral shifting action and other desirable characteristics of the shift registers would be desirable and a distinct advancement in the art. While development work has been progressing to improve these aforementioned basic magnetic core techniques, it has been found that a more economical and more versatile magnetic shift register may be had without resorting to the use of individual magnetic cores for the storage of binary information. This improved magnetic device results from the realization that a continuous piece of magnetic material may be employed to act as a shifting register. Heretofore, even though continuous magnetic materials in various forms have been employed as computer elements such as memory elements or delay elements, these elements have not approached the simplicity of the magnetic core register. Furthermore, these prior art techniques generally involve the dynamic propagation of the binary information in the magnetic medium. The use of a continuous piece of magnetic material which may be used as a delay element, a shift register, or the like and of an order of simplicity of a magnetic core register has been found to be practical. A shift register function results from the utilization of such a magnetic material by controlling the propagation of a discrete area or zone within the material. This mechanism, however, presents complex problems of introducing the information into the magnetic material, propagating it within the material, and finally deriving the information therefrom.

An improved and novel magnetic shift register has been found to result through the control of this discrete area or zone in the continuous magnetic material. The zone is arranged to be representative of the binary information to be shifted through the magnetic material. Various problems, however, have to be solved before the novel concept of propagating the zone can be successfully employed. Among these problems is that of assuring that the zone is unilaterally propagated and that the propagating force does not cause the zone to oscillate. Furthermore, once the propagation of the zone is initiated in the magnetic material, it must be controlled during the propagation intervals so that the zone or area will not be lost or diminished therein, resulting in a loss of information.

It is therefore a general object of this invention to provide a novel and improved magnetic shift register wherein no diodes or components between memory positions are required.

It is another object of this invention to provide a novel and improved magnetic shift register wherein information may be introduced or read in at a random rate and taken out or read out at a different or random rate.

It is a further object of this invention to provide a novel and improved magnetic device wherein an area of a particular state of magnetization may be introduced at one place on a magnetic medium and moved through said medium to a second place on said medium.

Further and additional objects and advantages will become apparent hereinafter during the detailed description of an embodiment of the invention which is to follow and which is illustrated in the accompanying drawings, wherein:

Fig. 5 is a schematic representation of the device shown in Fig. 1 including a representation of a propagating pulse pattern;

Figures 1, 4:
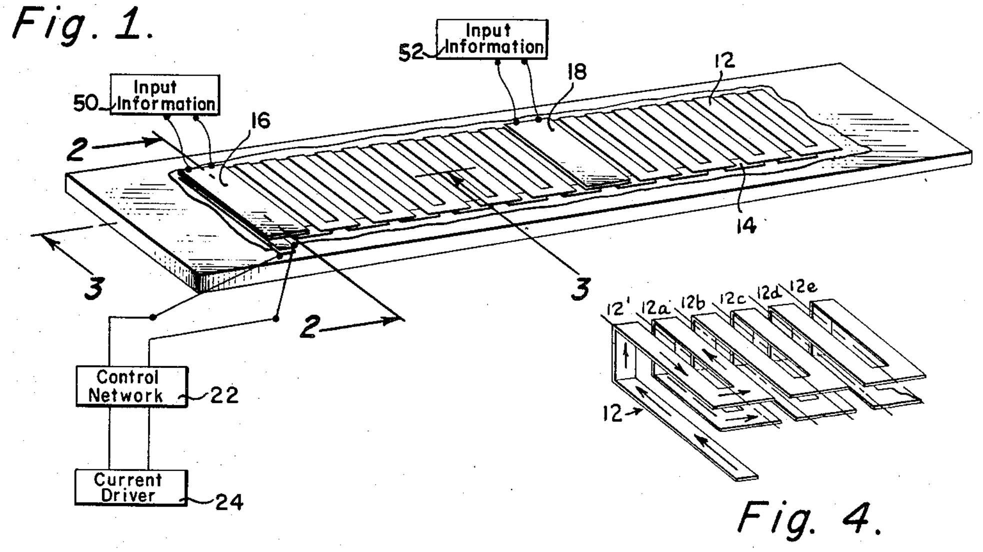
Fig. 1 is an exaggerated perspective view of a magnetic device embodying the invention with portions broken away and the associated circuitry shown in block form.
Fig. 4 is an enlarged and distorted view of the propagating electrode detached from the device of Fig. 1.

Generally, the invention contemplates the establishment of a zone or discrete area within a magnetic material and which zone or area is caused to be shifted through the magnetic material or medium under the coercion of an applied magnetic field. The magnetic medium is initially magnetized in a given direction and then by suitably proportioning the input energy applied to a read-in electrode coupled to the magnetic medium a discrete zone or area may be established within the magnetic material having a magnetization opposite to that of the remainder of the material. This zone may be propagated or shifted along the magnetic material by setting up a coercing magnetic field which is sufficient to allow the zone to travel within the magnetic medium but not of sufficient strength to create a new zone therein. The propagation of this zone results from the magnetic coupling of a driving current, proportioned below that applied to the read-in electrode, to the magnetic medium in a manner so as to set up a coercive pattern for propagating the zone longitudinally within the magnetic material. The zone may be read-out or derived from the magnetic medium by propagating it past a read-out electrode arranged at any convenient point along the material to generate an electrical output pulse therein.

The description of the noval magnetic device will be described with reference to Fig. 5 wherein the schematic representation of a magnetic medium 10 is shown with an over-all magnetization oriented in a predetermined direction represented by the arrow shown therein, that is from left to right. The magnetic medium 10 is further shown with a discrete zone identified as unit $10^a$ (two blocks) therein having a magetization opposite from that of the material proper and which magnetization is indicated by the arrow in zone $10^a$ as having an orientation from right to left. A plurality of separate looping electrodes generally identified by the reference characters 12 and 14 are shown magnetically coupled to the magnetic material 10 and longitudinally disposed thereon. Read-in electrodes 16 and 18 are also coupled to the magnetic medium 10, the former of which is shown at the left hand end section of the medium, while the latter is arranged opposite the zone $10^a$. A read-out electrode 20 is provided at the opposite end of the medium from read-in electrode 16.

The propagating electrode 14 is longitudinally displaced with respect to the propagating electrode 12 and is arranged in overlapping relationship therewith so that the entire magnetic material 10 is thereby looped by the combination of these electrodes. Each of the electrodes 12 and 14 are represented as discontinuous electrodes merely for purposes of explanation, and it should be noted that the electrodes are each formed in the physical embodiment as continuous electrodes. Accordingly, it should be appreciated that the current applied to the electrode 12 will pass serially through each of the electrode portions $12'$, $12^a$, $12^b$ . . . $12^n$. Similarly, a current applied to the electrode 14 will be conducted through each of the electrode portions $14'$, $14^a$, $14^b$ . . . $14^n$.

The read-in electrodes 16 and 18 are in this instance shown as magnetically coupled to the material 10 outwardly of the propagating electrodes 12 and 14. The read-out electrode 20 is coupled to the magnetic material 10 immediately adjacent thereto, that is inwardly of electrodes 12 and 14 so as to be enclosed by the corresponding electrode portions $12^n$ and $14^n$.

When functioning as a magnetic shift register for shifting electrical information represented in a binary code, the initial magnetization of the magnetic material 10 may be considered as representing the "zero" state or condition of binary coded information. The magnetization of a discrete area of the material 10 is changed only when the binary coded information applied to the read-in electrodes 16 or 18 represents the other state of the binary code, namely the "one" state. The representation of a binary "one" within the magnetic material 10 is assumed to comprise the zone $10^a$ in combination with the following adjacent parallel zone. The zone $10^a$ will be referred to hereinafter as an anti-parallel zone while the remainder of the zones are termed parallel zones. The parallel zone included in the representation of the binary one is the zone immediately following the zone $10^a$ and is identified as a unit by reference character $10^b$. It should be noted that the zone $10^a$ is arranged to have a width equal to the spacing between centers of adjacent electrodes on either set of propagating electrodes 12 and 14, for example between the centers of $14^e$ and $14^d$. Prior to examining the considerations for propagating an anti-parallel zone within the magnetic material 10, the theoretical relationship that must be appreciated to initially establish such a zone will be briefly discussed. The energy required to establish an anti-parallel zone and its separating walls may be defined for the purpose of this invention by the following expression:

Magnetic energy+Wall energy+Energy Absorbed in Hysteresis Loss

The magnetic energy is given by the expression $$-\tfrac{1}{2}\int(H\cdot M)dV$$

integrated over the total volume of the zone and its walls. The wall energy includes energy terms contained in the wall volume (such as the exchange energy) exclusive of the magnetic energy and those accounted for in hysteresis loss. The summation of all these energies is considered to represent the sum of all the input energies required to establish a discrete anti-parallel zone within a magnetic material. This quantity of energy is proportioned so that it merely changes the magnetization of the magnetic material immediately adjacent the read-in electrode, leaving the remaining portions unaltered. It will be appreciated by those skilled in the magnetic art that the magnetic energy and the wall energy are recoverable. Therefore the only energy loss in the above energy summation expression is the hysteresis loss. This necessarily implies that an anti-parallel zone and its walls have a higher energy content than the remaining portions of the magnetic material. Since the necessary wall energy to create a domain has already been supplied, it is necessary to merely supply the hysteresis loss energy in order to shift the position of an anti-parallel zone. Accordingly, the energy requirement for propagating a zone is less than the quanta of energy required for establishing the zone initially. Upon the application of the correctly proportioned quanta of energy to an established zone the zone will be shifted in response thereto. This intrinsic energy relationship has been found to be true since once an anti-parallel zone is established in a magnetic material, the zone will shift or progagate in the material in response to a suitable propagating pattern and which pattern requires a decreased amount of energy to establish.

The considerations for shifting or propagating the anti-parallel zone $10^a$ will now be examined. It will be appreciated by those skilled in the computer art that in conventional magnetic shift register operation and structure, as well as the shift register of this invention, unidirectional propagation of the binary information is necessary to prevent the confusion of the information therein. The coercing force pattern for shifting the zone $10^a$ to the right within the material 10, as shown in Fig. 5 is provided by applying an input current, proportioned in accordance with the specifications discussed hereinabove, to the propagating electrodes 12 and 14. The electrodes 12 and 14 should be alternately energized to produce the desired coercing pattern as will become evident immediately hereinafter.

The successive portions of the propagating electrodes 12 and 14 for the purposes of the present discussion are magnetically oriented with respect to the material 10 to produce a magnetic force within the material of opposite senses. For example, upon application of a propagating driving current to electrode 12 the electrode portion $12^b$ will produce a force tending to orient the domains of the magnetic material to the right while the same current passing through the portion $12^c$ produces an equal force in the opposite direction, to the left. The spacing of the propagating electrodes 12 and 14 is represented similarly in both Figs. 5 and 6 and is arranged so that the spacing of the electrode portions $12'$, $12^a$, $12^b$ . . . $12^n$ is such as to leave the magnetic material falling at approximately a central line in the gaps between these electrode portions unactivated. This may be appreciated from the resultant field going to zero on the force diagram of Fig. 6, wherein the aforementioned force relationship is represented in terms of the distances along the magnetic medium 10 and wherein points such as the points *c*, *e*, *g*, and *i* represent the position of the unactivated electrode. The coercing forces produced at the electrode portions 12′, $12^a$, $12^b$ . . . $12^n$ act on the boundaries of zone $10^a$ so as to cause the adjacent dipoles thereof to turn or reorient themselves in the direction of these coercing forces. These equal but opposite coercing forces are effective to propagate the zone $10^a$ longitudinally within the material 10 upon "catching up" with the zone.

It will be noted from an examination of a pulse propagation pattern accompanying Fig. 5 that a series of diagonals shown in dot-dash lines, may be seen to occur. These diagonals fall through the elemental coercive forces occurring during the intervals $T_1$ through $T_4$ and a zone to be propagated falling within or coinciding with the diagonal will be "caught" so as to be shifted in response to these coercing forces. This "catching up" merely refers to the phase relationship required between a zone "read-in" to the magnetic medium 10 with respect to a propagating pulse pattern. The continued shifting of a zone will be appreciated more readily when it is recalled that the activated propagating electrode will shift the zone under the non-activated electrode. The alternate energization of the propagating electrodes will effect the desired shifting action or propagation of a zone. It will further be seen that after the forces produced at interval $T_4$ have acted on a zone, the zone will be positioned to be "caught" by the succeeding diagonal force pattern, initiated once again during the interval $T_1$.

To appreciate the need for a pair of propagating electrodes, a further examination of the nature of the coercing forces is required. It has been now established that a single electrode will have its successive electrode portions producing forces on the boundaries of a zone in opposite direction. Depending on the relative width of the zone and the propagating electrode, these coercive forces acting on the zone boundaries, will cause the zone area to diminish or collapse completely. This second electrode may then be said to function to orient the individual dipoles on the leading edge of the shifting zone or the advancing right hand boundary, in a direction to be re-oriented in response to the pulse "catching up" with it to thereby allow the zone to propagate without being reduced in width.

Figure 6:
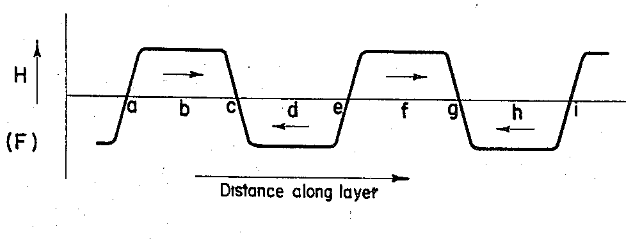
Fig. 6 is a graphical representation of the magnetic forces developed upon energizing an electrode as shown in Fig 4.

Considering the zone $10^a$ as having been established at the point of the magnetic material 10 corresponding to the position of read-in electrode 18, it will be seen that the zone $10^a$ will be "caught up" by the third diagonal from the left at a point in time corresponding to the interval $T_2$. During interval $T_2$, electrode 14 will be energized and produce a coercing force so that the left hand boundary of zone $10^a$ is shifted from below the electrode portion $14^d$ to a point below electrode portion $10^e$, substantially coinciding with the dot-dash line passing through the aforementioned diagonal at interval $T_2$. The force diagram of Fig. 6 is shown as superimposed over the propagating pulse pattern of Fig. 5. The point "*a*" of Fig. 6 corresponds to the coordinates $T_2$ and the center line for electrode portion $12^d$, while the other extremity of the force diagram, point "*i*" falls at the intersection of $T_2$ and the center of electrode portion $12^h$. Since the application of such a force pattern is effective to "catch up" with the zone $10^a$, the zone will be shifted one block to the right. This shifting of the left hand boundary of zone $10^a$ is effected due to the response of the zone boundary to the coercing force provided at electrode portion $14^d$ acting thereon and which force turns the dipoles in the direction of the coercing force. Similarly, the coercive force provided by the energization of electrode portion $14^e$ will orient the dipoles coupled thereto in an anti-parallel direction to thereby cause the right hand boundary of zone $10^a$ to terminate adjacent the center of electrode portion $12^f$. The binary "one" will in this manner be shifted to the right and is defined by the four zones extending between electrode portions $12^d$ and $12^f$ as shown in dotted outline. This newly positioned zone $10^a$ will be again "caught" by the propagating pulse pattern at the interval $T_3$. The electrode portions $12^e$ and $12^f$ are effective during interval $T_3$ to shift the boundaries of the zone so as to fall below the unenergized electrode 14. In a similar manner at interval $T_4$, the newly positioned zone $10^a$ is "caught" by the coercive forces provided by the energized electrode portions $14^e$ and $14^f$. The zone $10^a$ at the end of interval $T_4$ will have its left hand boundary substantially centrally of electrode portion $12^f$ and the right hand boundary substantially at the center of electrode portion $12^g$. It will now be appreciated that if the electrode 12 is energized a coercive pattern will be produced at these electrode portions so as to again "catch up" with and shift zone $10^a$ over into the area under the influence of the electrode 14. This latter mentioned shifting interval will be seen to have the same force characteristics as that produced during interval $T_1$ and is shown falling along the fourth diagonal from the left. This propagating pattern will now once again continue to shift the zone $10^a$ towards the read-out electrode 20 as long as the electrodes 12 and 14 are energized to produce the desired propagating pattern.

In addition to the alternate energization of the propagating electrodes 12 and 14, they must be energized from a source of the correct polarity to provide the correct coercive forces. The above described shifting pattern will be developed if during the intervals $T_1$ and $T_2$ the propagating electrodes 12 and 14 are alternately energized from a source producing positive current pulses. The correct coercing forces will be developed during intervals $T_3$ and $T_4$ if a driving source producing negative current pulses is connected to electrodes 12 and 14 alternately during intervals $T_3$ and $T_4$.

Although explicit mention has not been made of means for preventing the spontaneous destruction of the zone due to excessively high H fields arising from the adjacent oppositely magnetized areas, this spontaneous action can be controlled by appropriate geometry and the use of a shunting magnetic material, if necessary. This H field, included in the energy summation expression hereinabove, must be maintained as high as possible short of destroying the zone, since it is a contributing term in the magnetic energy associated with the zone as may be readily seen from the energy summation expression. It should be noted that the binary information is defined by four cells or the combination of units $10^a$ and $10^b$ to prevent the interference of propagating information in the magnetic material.

Figure 7:
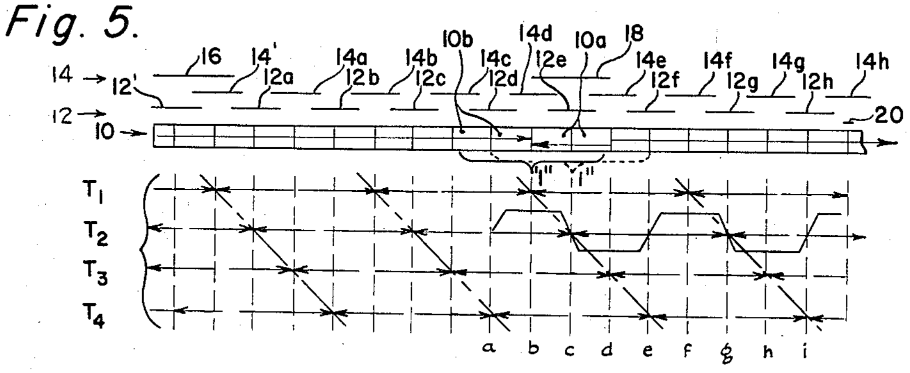
Fig. 7 is a schematic representation of the control network for producing the propagating pattern of Fig. 5.

Now referring to Fig. 7, a schematic representation of a network 22 for controlling the application of a driving source 24 to the electrodes 12 and 14 for establishing the propagating pattern in the magnetic material 10 will be described. The current driver 24 comprises the positive current driver 26 and the negative current driver 28. The characterization of these drivers 26 and 28 as positive and negative merely refers to the polarity of their output currents for application to the input terminals of electrodes 12 and 14. Accordingly, the terminal $26^a$ of driver 26 and the terminal $28^a$ of driver 28 are connected to the propagating electrodes 12 and 14 by means of control network 22. The remaining terminals of drivers 26 and 28 along with those of electrodes 12 and 14 are shown grounded. It should be understood that the current provided by each of the drivers 26 and 28 are substantially equal in intensity.

The control network 22 comprises a plurality of bistable switching elements 30 and 32 under the control of a clock pulse or timing generator 34. The current drivers 26 and 28 are interconnected with the bistable elements 30 and 32 by means of a logical circuit arrangement for controlling the application of the current drivers 26 and 28 to the electrodes 12 and 14. The logical arrangement in this instance includes the logical "and" circuits or gates 36 and 38 and the logical "or" circuit 40 for controlling the current applied to electrode 12. The logical arrangement further includes "and" gates 42 and 44 and "or" circuit 46 for controlling the application of currents to electrode 14. The output terminal 26a of the positive current driver 26 is connected to one of the inputs for each of the "and" gates 36 and 42. Similarly, the negative current driver 28 has its output terminal 28a connected to one of the inputs for "and" gates 38 and 44. The remaining inputs to each of the aforementioned "and" gates are connected to predetermined outputs of bistable elements 30 and 32.

The bistable elements 30 and 32 shown in block form may be any conventional bistable element well known in the art, such as the Eccles-Jordan flip-flop circuit. The outputs of the flip-flop circuits are identified in Fig. 7 as Q and $\bar{Q}$. Q corresponds to one output of the flip-flop while the $\bar{Q}$ output corresponds to its binary complement present in the same flip-flop. The Q output for bistable element 30 is connected to an input lead for the "and" gate 36 and the "and" gate 38. The Q output for element 30 is further connected to control the state of element 32 by a direct connection to the input circuit of bistable element 32. The $\bar{Q}$ output of element 30 is directly connected to an input lead for "and" gate 42 and an input lead for "and" gate 44. The Q output for bistable element 32 is directly connected to an input lead for an "and" gate 38 and an input lead for "and" gate 42, while the $\bar{Q}$ output is directly connected to an input lead for "and" gate 36 and an input lead for "and" gate 44. The input lead for bistable element 30 is directly connected to the clock pulse generator 34 and its state is directly dependent thereon, while bistable element 32 is under the control of element 30 through the aforementioned Q output. An "or" circuit 40 is interposed between the output leads of the "and" gates 36 and 38 and which "or' circuit in turn has its output lead connected to the input terminal of electrode 12, the "or" circuit 46 receives the output signal from "and" gates 42 and 44 and has its output lead connected to the input terminal of electrode 14.

Figure 7A:
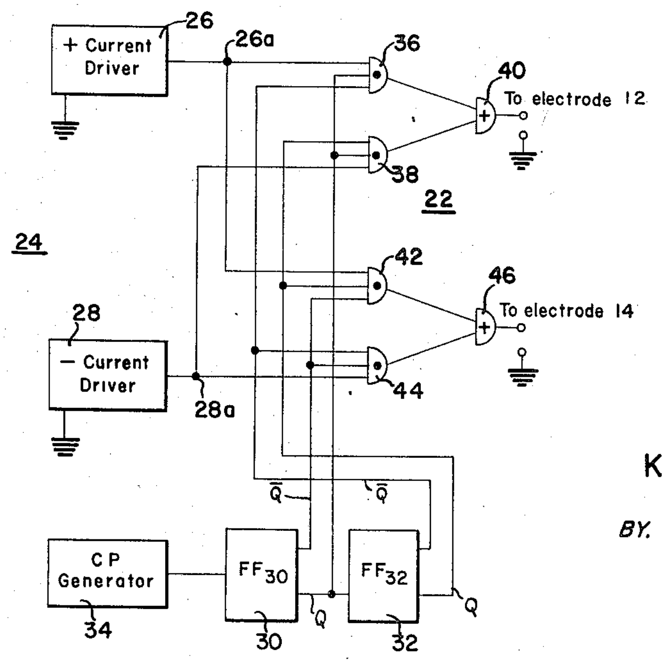
Fig. 7A is a chart showing the relative states of the bistable elements shown in Fig. 7.

Referring to the chart shown in Fig. 7A, the relationship of the states of bistable elements 30 and 32 during the intervals $T_1$ through $T_4$ will be described for developing the above described propagating pulse pattern. The states of the bistable elements shown in this chart correspond to the state of the Q outputs only shown as one or zero, the $\bar{Q}$ state being the complement of the Q output. The time intervals $T_1$ through $T_4$ will be the same time intervals as described in conjunction with the propagating pulse pattern of Fig. 5 and are described as corresponding to successive pulses provided by clock pulse generator 34.

Initially, assume that both elements 30 and 32 are in the zero state, that is both Q outputs are in a low voltage state. The first clock pulse from generator 34 is applied to bistable element 30 at interval $T_1$ so as to place it in the one state; Q output in a high voltage state. The high voltage is coupled to the "and" gates 36 and 38. The current driver 26 is also connected to the "and" gate 36 along with the $\bar{Q}$ output of bistable element 32. Since the state of the element 32 has not been changed at $T_1$, the $\bar{Q}$ output will be in a high voltage state. This output in combination with the high voltage output from element 30 will condition gate 36 to pass current from driver 26 to the electrode 12 through the logical "or" circuit 40. On the succeeding pulse interval, that is $T_2$, bistable element 30 will be reset to the zero state due to the application of a pulse from generator 34 and the first clock pulse will be transferred to element 32 setting it in the one state. This relationship of the elements 30 and 32 is borne out by the chart of Fig. 7A. At the interval $T_2$ it is desired to couple the positive current driver 26 to the electrode 14. This application of the current driver 26 to electrode 14 does result at this interval since the "and" gate 42 has all of its conditions satisfied for passing the current from the driver 26 therethrough. The "and" gate 42 has connected thereto, in addition to the current driver 26, the Q output from bistable element 32 along with the $\bar{Q}$ output of bistable element 30. Accordingly, the current driver 26 will be connected to the electrode 14 through the "and" gate 42 and the "or" gate 46. During the next pulse interval, namely, $T_3$, it is desired to apply the negative current driver 28 to the electrode 12. The succeeding clock pulse will reset bistable element 30 to the one state so that both elements 30 and 32 will have their Q outputs in a high voltage state during this interval. Accordingly, the "and" gate 38 will be conditioned, since both the Q outputs for elements 30 and 32 are connected thereto along with the driver 28 and the current therefrom will be applied to the electrode 12 through "and" gate 38 and the "or" circuit 40. The last time interval, or the final interval $T_4$, finds the elements 30 and 32 responding to the 4th pulse from generator 34 so that both the elements are reset to the zero state. Under this condition the $\bar{Q}$ outputs for the elements 30 and 32 are both in a high voltage state and since these outputs are connected to "and" gate 44 along with current driver 28, the current from driver 28 will be applied to electrode 14 through the "and" gate 44 and the "or" circuit 46. The 5th pulse delivered from the clock pulse generator 34 will set the bistable element 30 in the one state and leave the element 32 in the zero state. It will be appreciated that this 5th pulse will place elements 30 and 32 in states corresponding to the first time interval $T_1$, and the coupling of the current driver 26 to the electrode 12 will be effected in the same fashion as during the $T_1$ interval. The pulse propagation pattern will be repeated cyclically in this manner for shifting a zone to any desired position within a magnetic medium. The velocity of shifting a zone in this manner is determined by the pulsing rate.

The pulsing pattern may be generated in other ways than by the above described logical circuitry and is not considered to be limited to purely electrical systems. A mechanical rotating field system may be employed to provide the correct propagating pulse pattern. It will also be appreciated that the physical construction of the propagating electrodes along with the control apparatus for establishing the propagating pulse pattern will be dependent on the relative magnetic orientations of the zone with respect to the overall orientations of the magnetic material proper. In furtherance of this end, it will be recognized that a magnetic material may have an overall magnetic orientation transverse to its longitudinal axis in a given direction while the zone is similarly arranged but in the opposite direction.

Referring now to Fig. 1, the physical construction of a magnetic device embodying the above described shifting zone concept and arranged to function as a magnetic shift register will now be described. It should be understood at the outset that the physical embodiment of a device utilizing the novel shifting zone concept may be utilized to effect functions other than that of a magnetic shift register, some of which are a delay line, gating element, including the formation of the magnetic device as a closed loop to form a magnetic memory similar to that of a conventional magnetic drum but wherein the binary bits of information circulate rather than rotating the drum itself.

The magnetic shift register has been constructed as shown by means of known vacuum evaporation techniques for preparing and depositing electrical and magnetic films. The magnetic shift register may be constructed of other materials and by different techniques. For example, other materials which will support domain patterns such as ferroelectrics may be used with this concept and non-evaporated materials may be employed. These vacuum evaporation techniques for preparing films are known in the art, as exemplified by the detailed description in an article entitled "Preparation of Thin Magnetic Films and Their Properties," by M. S. Blois, Jr., which appears in the August 1955 issue of the Journal of Applied Physics beginning on page 975 and ending on page 980, and which article is incorporated herein by reference.

The description of the physical construction of the magnetic shift register will parallel the schematic representation of the shifting register shown in Fig. 5 and the description thereof hereinabove. A carrier or substrate 56 is provided for supporting the films deposited thereon and which films comprise the magnetic shift register. The substrate 56 is in this instance shown as a glass substrate, however, any suitable supporting insulative medium will suffice, for the purposes of this invention. Due to the extreme overall thinness of the layers of films, the illustrations of the magnetic device have been distorted in order to show the desired physical relationship of these films. The overall thickness of the films is on the order of .0005 inch, if these films were detached from the substrate 56 itself. With this in mind, along with the appreciation that the thickness of the conductive layers forming the propagating electrodes 12 and 14 are on the order of 10,000 Angstroms, the device may best be described considering that these films are detached from the substrate.

One of the propagating electrodes, the electrode 12 is shown in Fig. 4 detached from the magnetic shift register proper. It will be recalled from the description of the schematic representation of the magnetic device hereinabove that the propagating electrodes function as looping electrodes. In order that they may function as looping electrodes, the electrodes are in this instance shown as a folded grid in Fig. 4; that is the grid comprises a framework of parallel connected elements folded as U sections to loop a magnetic material passed therethrough. The electrode portions $12'$, $12^a$, $12^b$ . . . $12^n$ referred to hereinabove comprise the upper and lower parallel sections of the folded grid lying in the same vertical plane and defining the U sections. It will be noted from an examination of Fig. 4 that the configuration of the propagating electrode 12 is such that the electrode portions $12'$, $12^a$, $12^b$ . . . $12^n$ are effectively individually spaced apart wraps with respect to a magnetic material looped thereby.

Figure 2:
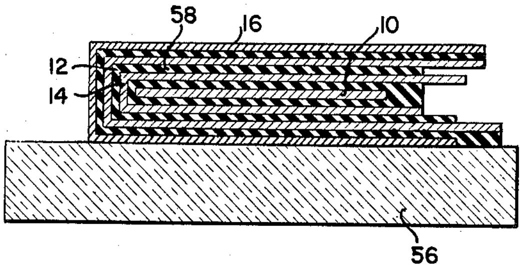
Fig. 2 is a distorted and enlarged vertical sectional view of the device shown in Fig. 1.
Figure 3:
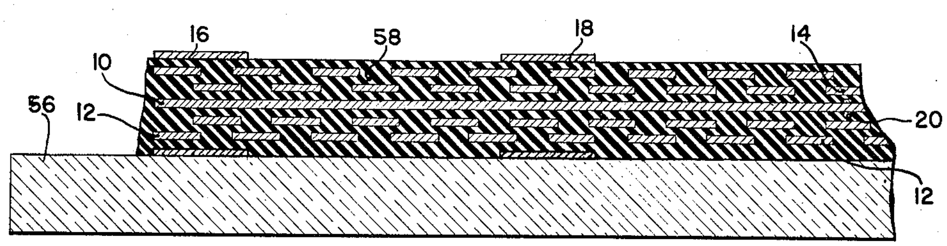
Fig. 3 is a distorted and enlarged sectional view taken along the line 3—3 of Fig. 1.

The second propagating electrode 14 is of an identical configuration to that of the electrode 12 and is coupled to the magnetic medium by being deposited longitudinally displaced with respect to the electrode 12. The second electrode 14 is effective on the magnetic medium at points intermediate the electrode portions $12'$, $12^a$, $12^b$ . . . $12^n$; that is the electrode portions $14'$, $14^a$, $14^b$ . . . $14^n$ are deposited between portions $12'$, $12^a$, $12^b$ . . . $12^n$. The layer of magnetic film 10 is deposited centrally of the electrodes 12 and 14 as shown in Figs. 2 and 3. It will be understood, of course, that each of the individual films or layers 10, 12 and 14 as well as the read-in electrodes 16 and 18 are separated by an insulative layer generally identified by the reference character 58. The propagating electrodes 12 and 14 are further shown in Fig. 1 connected to the current driver 24 through the control network 22, as discussed hereinabove.

The magnetic device shown in Fig. 1 includes the read-in electrodes 16 and 18 with the electrode 16 shown at the left hand end section of the device, while the electrode 18 is positioned intermediate the ends of the device corresponding to that shown in the schematic illustration thereof. Each of the read-in electrodes 16 and 18 is also constructed of conducting films similar to the propagating electrodes 12 and 14. The read-in electrodes 16 and 18 are each arranged so as to establish an antiparallel zone equal to the spacing between the centers of the adjacent propagating electrodes as mentioned hereinabove, for example $14^e$ and $14^d$. Electrodes 16 and 18 are further shown as connected to sources of input information 50 and 52 shown in block form and which sources are similar with respect to the current requirements thereof for establishing the zone in the magnetic film 10. The read-out electrode 20 is shown in Fig. 3 at the right hand end section of the magnetic device and is positioned in intimate contact with the magnetic film 10. The read-out electrode 20 is of a narrower width with respect to the propagating electrodes 12 and 14 so as to produce a sharp output signal in response to the passage of a zone thereby.

It will now be appreciated that a novel and improved magnetic device capable of being utilized as a magnetic shift register without resorting to the use of diodes or other components between memory positions has been disclosed. The novel shifting zone concept employed in the device will accept information at a random rate and be read out at a random rate.

What is claimed is:

1. A magnetic device comprising a magnetic medium having an overall-magnetization of a predetermined magnetic characteristic, means magnetically coupled to said medium for establishing a discrete zone of magnetization within said medium of a magnetic characteristic different from the predetermined magnetic characteristic, propagating means coupled to said magnetic medium along a continuous predetermined portion thereof including the portion coupled by said first mentioned means, said propagating means being arranged and defined with respect to said medium to be effective to shift the position of the zone within said medium in steps, and further means magnetically coupled to said medium for deriving an electrical signal from said medium.

2. A magnetic device comprising an elongated magnetic medium having a predetermined magnetic characteristic, a plurality of propagating electrodes magnetically coupled to said medium and coextensive with a predetermined portion thereof, each of said plurality of electrodes being defined so as to be effective upon energization thereof to produce a coercive force in said medium over different but overlapping portions of said medium, a read-in electrode magnetically coupled to said medium at a portion thereof coextensive with said propagating electrodes, and a read-out electrode magnetically coupled to said magnetic medium at a point coextensive with said propagating electrode and spaced from said read-in electrode.

3. A magnetic device as defined in claim 2 including a first current source adapted to be connected to said read-in electrode, said current source being proportioned to establish a zone of magnetization within said medium different from said predetermined magnetic characteristic, and a second current source adapted to be and controllably connected to said propagating electrodes, said second current source being proportioned below that of said first source.

4. A magnetic device comprising an elongated magnetic medium characterized as having an overall magnetic orientation in a predetermined direction with respect to its elongated axis, read-in electrode means magnetically coupled to a portion of said magnetic medium, an electrical information source adapted to be connected to said read-in electrode means for establishing a discrete zone of magnetization in said medium having a magnetic orientation of an opposite direction to that of the medium, a plurality of propagating electrodes magnetically coupled to said medium longitudinally thereof including the portion of said medium coupled by said read-in electrode means, said propagating electrodes being coupled and disposed with respect to said medium to be effective at spaced apart overlapping intervals, electrical driving means adapted to be alternately connected to said propagating electrodes for shifting the zone longitudinally through said magnetic medium, and a read-out electrode magnetically coupled to said medium at a point thereon to derive an electrical information pulse in response to the shifting of the zone by said read-out electrode.

5. A magnetic shift register comprising an elongated magnetic material having a predetermined magnetic characteristic, a first propagating electrode coupled to said material and disposed thereon along its elongated axis, said first electrode being defined as a looping electrode to induce coercive forces in said medium effective over spaced apart portions thereof upon energization of said electrode, a second propagating electrode coupled to said material and disposed thereon in partially overlapping relationship with respect to successive portions of said first electrode, said second electrode being defined as a looping electrode to induce coercive forces in said medium effective over the portions of said medium substantially unaffected by said first electrode, a read-in electrode coupled to said material at a point thereon co-extensive with said first and second electrodes, and a read-out electrode coupled to said material at a different point from said read-in electrode and coextensive with said first and second electrodes.

6. A magnetic device comprising an insulative carrier, a first electrical conductive film deposited at predetermined spaced apart intervals on said carrier to form a looping electrode, a second electrical conductive film deposited on said carrier at spaced apart intervals overlapping successive portions of said first electrical film and insulated therefrom to form a second looping electrode, a magnetic film deposited on said carrier so as to be looped by said first and second electrodes and insulated therefrom, a read-in electrode deposited as a film on said carrier so as to magnetically couple said magnetic film, and a read-out electrode deposited as a film on said carrier so as to magnetically couple said magnetic film and spaced from said read-in electrode.

7. A magnetic device comprising an elongated magnetic medium having a predetermined magnetic characteristic, a plurality of propagating electrodes magnetically coupled to said medium and coextensive with a predetermined portion thereof, each of said plurality of electrodes being defined so as to be effective to produce a coercive force in said medium upon energization thereof over different but overlapping portions of said medium, a read-in electrode magnetically coupled to said medium at a portion thereof co-extensive with said propagating electrodes, electrical circuit means adapted to be connected with said read-in electrodes for establishing a discrete zone of magnetic characteristic different from that of the medium, a read-out electrode magnetically coupled to said magnetic medium at a point coextensive with said propagating electrode and spaced from said read-in electrode, a circuit magnetically connected to said read-out electrode for deriving therefrom an electrical signal upon the propagation of the zone past said electrode, a current source proportioned to produce the aforementioned coercive force in said propagating electrode and a control network connected to said propagating electrodes for alternately energizing same from said source in a predetermined phase, said control network including a logical circuit arrangement.

8. A magnetic device as defined in claim 7 wherein said current source is adapted to provide currents of different polarity to said propagating electrodes, and said logical circuit arrangement is adapted to connect said currents of different polarity to said propagating electrodes at predetermined intervals in a cyclic manner.

9. A magnetic device as defined in claim 1 wherein said magnetic medium is deposited as a film on an insulative carrier.

10. A magnetic device as defined in claim 1 wherein at least one of said means coupled to said magnetic medium is deposited as a film.

11. A magnetic shift register comprising a magnetic medium having an over-all magnetization of a predetermined magnetic characteristic, means magnetically coupled to said medium for establishing a discrete zone of magnetization within said medium of a magnetic characteristic different from the predetermined magnetic characteristic, a source of electrical information to be shifted connectable to said means for establishing the information in said medium as said discrete zone, propagating means coupled to said magnetic medium along a continuous predetermined portion thereof, said propagating means being arranged and defined with respect to said medium to be effective over predetermined intervals thereof, electrical control means connected to said propagating means for shifting said zone through said magnetic medium, and further means magnetically coupled to said medium for deriving the electrical information from said medium at a predetermined time interval after the establishment of same.

12. A magnetic shift register comprising a magnetic medium having an over-all magnetization of a predetermined polarity, a source of electrical information to be shifted through said register, read-in means magnetically coupled to said medium and connected to said source for establishing a discrete zone of magnetization within said medium of a polarity different from the predetermined polarity, first and second propagating electrodes coupled to said magnetic medium and each being defined to loop and medium for inducing forces therein effective over different areas to shift said zone to the other of said electrodes, control means proportioned for alternately energizing said electrodes to shift said zone to the other of said electrodes, and read-out means magnetically coupled to said medium for deriving the electrical information from said medium at a point thereon spaced from said read-in means.

13. A magnetic shift register as defined in claim 12 wherein said magnetic medium is deposited as a film on an insulative carrier and said read-in means, read-out means and said propagating electrodes are deposited as films in intimate contact with said magnetic medium.

14. A magnetic shift register as defined in claim 12 wherein said first and second propagating electrodes are each inductively coupled to said magnetic medium and each are constructed and arranged for defining alternate inductive loops effective to create forces of opposite senses in said medium.

15. A magnetic device comprising a magnetic medium having an initial state of magnetization, input means magnetically coupled to said magnetic medium at a first predetermined place thereof for establishing in said magnetic medium an area of a different state of magnetization, output means responsive to the state of magnetization of said magnetic medium at a second predetermined place thereof spaced from said first predetermined place by a continuous portion of said magnetic medium, and means magnetically coupled to said magnetic medium along said continuous portion thereof for moving the area of said different state of magnetization from said first predetermined place to said second predetermined place on said magnetic medium within said continuous portion thereof.

16. A magnetic device comprising a magnetic medium having an initial state of magnetization, input means responsive to electrical signals and magnetically coupled to said magnetic medium at a first predetermined place thereof for establishing in said magnetic medium an area of a different state of magnetization in accordance with said electrical signals, output means responsive to the state of magnetization of said magnetic medium and magnetically coupled to said medium at a second predetermined place thereof spaced from said first predetermined place by a continuous portion of said magnetic medium, for providing electrical signals in accordance with said state of magnetization, and means magnetically coupled to said magnetic medium along said continuous portion thereof for moving the area of said different state of magnetization from said first predetermined place to said second predetermined place on said magnetic medium within said continuous portion thereof.

References Cited in the file of this patent

Publication: "The Transfluxor" Proceedings of the IRE, vol. 44, issue 3, pp. 321–332, March 1956.

UNITED STATES PATENT OFFICE

CERTIFICATE OF CORRECTION

Patent No. 2,919,432 December 29, 1959

Kent D. Broadbent

It is hereby certified that error appears in the printed specification of the above numbered patent requiring correction and that the said Letters Patent should read as corrected below.

Column 5, line 54, for "$10^e$" read -- $12^e$ --; column 7, line 36, for "which "or' circuit" read -- which "or" circuit --; column 12, line 29, for "and medium" read -- said medium --.

Signed and sealed this 7th day of June 1960.

(SEAL)
Attest:

KARL H. AXLINE
Attesting Officer

ROBERT C. WATSON
Commissioner of Patents